E. DANIELS.
MOTOR VEHICLE.
APPLICATION FILED SEPT. 13, 1917.

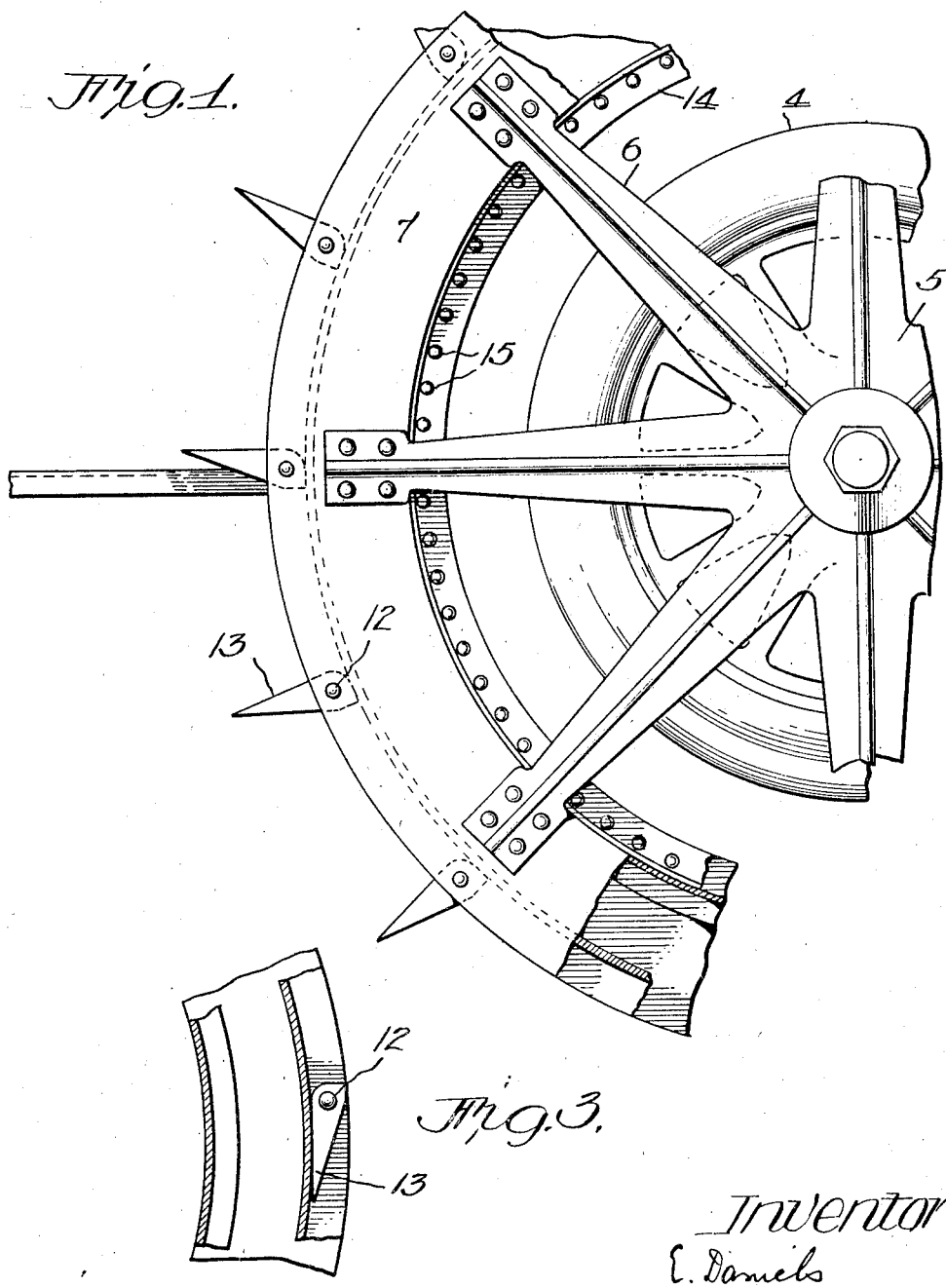

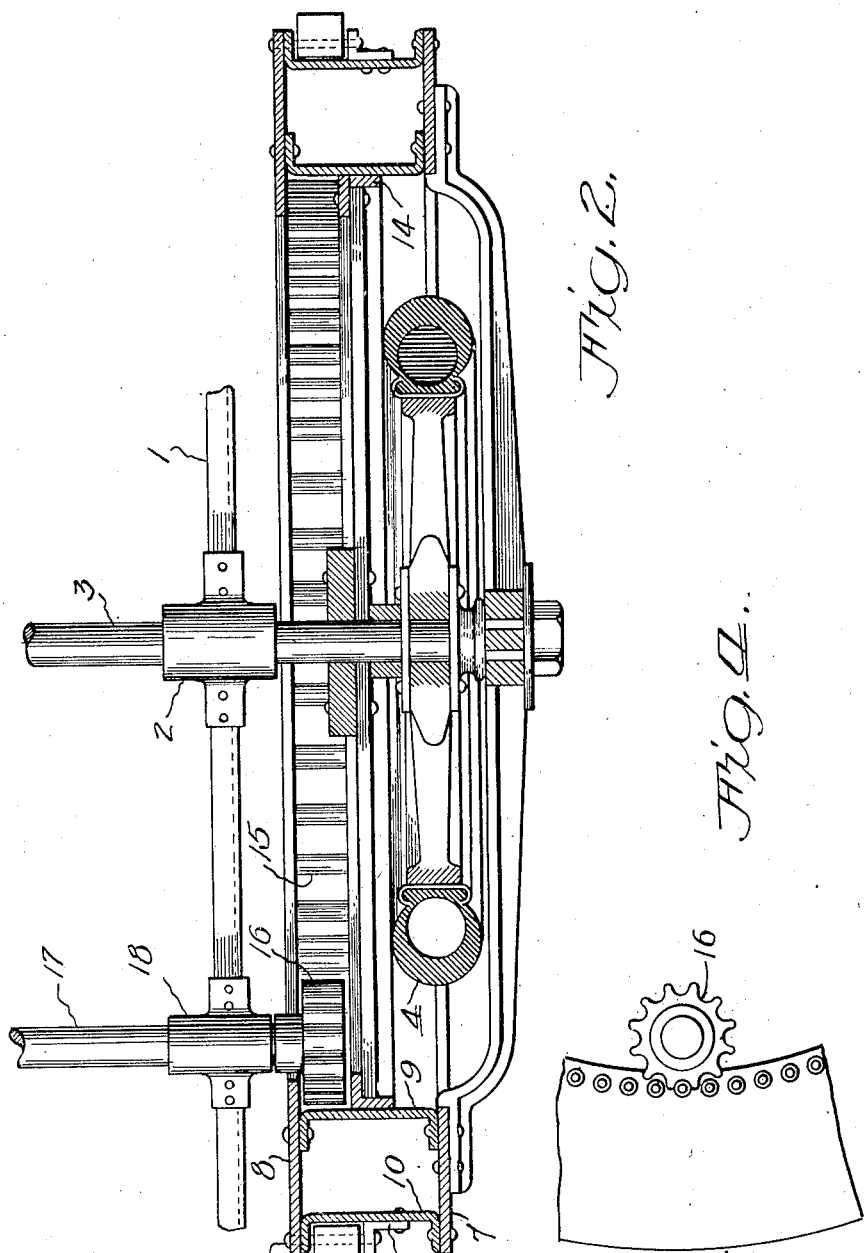

1,359,670.

Patented Nov. 23, 1920
3 SHEETS—SHEET 3.

Witnesses:

Inventor:
E. Daniels
By H. J. Sanders
Atty.

UNITED STATES PATENT OFFICE.

EMIL DANIELS, OF NORTH REGINA, SASKATCHEWAN, CANADA.

MOTOR-VEHICLE.

1,359,670.   Specification of Letters Patent.   Patented Nov. 23, 1920.

Application filed September 13, 1917. Serial No. 191,282.

*To all whom it may concern:*

Be it known that I, EMIL DANIELS, a citizen of Petrograd, Russia, residing at North Regina, in the Province of Saskatchewan, in the Dominion of Canada, have invented certain new and useful Improvements in Motor-Vehicles, of which the following is a specification.

This invention relates to improvements in motor vehicles and more particularly to an automobile adapted to be driven upon ice and snow or over an ordinary road. A further object is to provide a vehicle of this type which may be interchangeably carried upon pneumatic tired wheels or upon spur drive wheels. With the foregoing and other objects in view the invention consists in the combination and arrangement of parts to be hereinafter fully described in this specification, pointed out in the appended claim and illustrated in the accompanying drawings which form a part of the specification and in which—

Figure 1 is a fragmentary view in side elevation of my improved device.

Fig. 2 is a section through my improved device and through the vehicle wheel and showing the means for driving my device.

Figs. 3 and 4 are fragmentary views.

Like reference characters denote corresponding parts throughout the several views.

Figure 5:
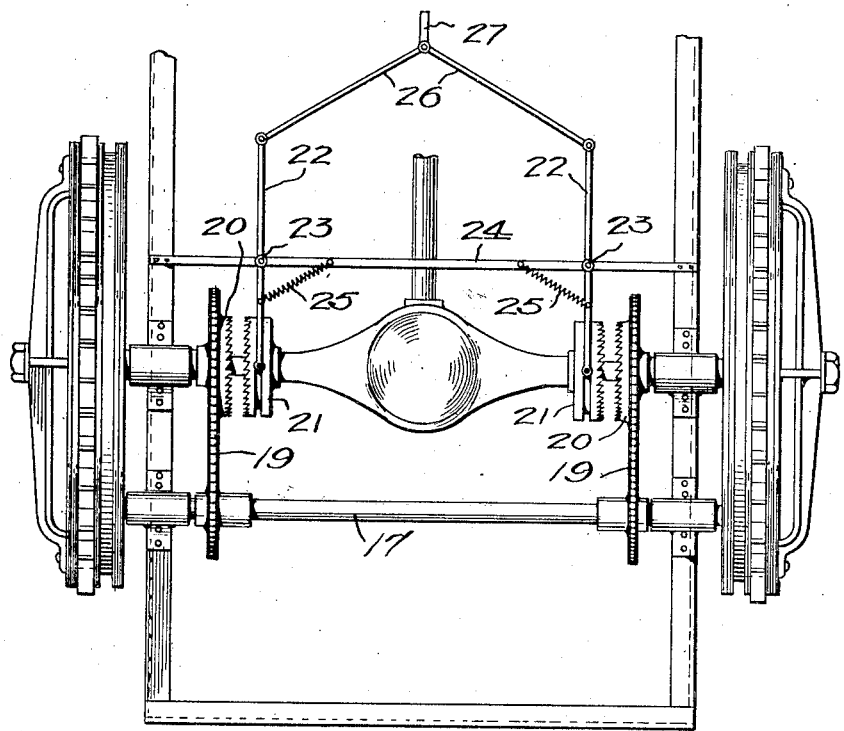
Fig. 5 is a fragmentary plan view of a vehicle constructed along the lines of my invention.

The reference numeral 1 denotes a portion of the chassis provided with bearings 2 for the vehicle axles 3 having mounted thereon the usual pneumatic tired wheels 4 adapted to travel over ordinary roads. When the vehicle is driven over ice or snow roads it is equipped with my traction wheels each of which comprises a hub 5, mounted loose upon the axle 3, said axle extending through the hubs of the wheels 4 and also through the hubs 5 in which latter members it is free to rotate independently, the said hubs 5 abutting the hub caps of the wheels 4 and the nuts terminally carried by the axle 3, from which radiate the spokes 6 that are bolted to one of the sides 7 of the felly, the other side 8 of the felly being connected to the said side 7 by the bridge 9 and by the outer rim 10, U-shaped, which is provided with the band or angle piece 11 which together with one side rim and the outer edge of the side 8 of the felly carries the bolts 12 upon which the spurs or teeth 13 are pivotally carried. To the bridge 9 an inner rim 14 is secured that is connected by the reduced ends of the teeth 15 with the side 8 of the felly; said teeth 15 extending entirely around the wheel just below the bridge 9.

Driving pinions 16 fast upon a transmission shaft 17 mesh with the said teeth 15 to drive the wheels, the said shaft being journaled in suitable bearings 18 carried by the chassis. The shaft 17 is, of course, operatively connected to the driving axle by the chain drives 19 which connect said shaft 17 directly with the clutch members 20 loose upon the drive axle. Coöperating clutch members 21 slidably keyed to the said drive axle are engaged by levers 22 fulcrumed at 23 to a brace 24 carried by the chassis, said levers 22 being engaged by springs 25 also connected to said brace 24 whereby said levers are yieldingly retained in disengaged relation with the clutch members 20. A control lever 26 connected to said levers 22 is operable by rod 27 to move said sliding clutch members 21 as desired. The large wheels provided with spurs 13 are loose upon the drive axle while the pneumatic tired wheels 4 are fast thereupon.

Figure 6:
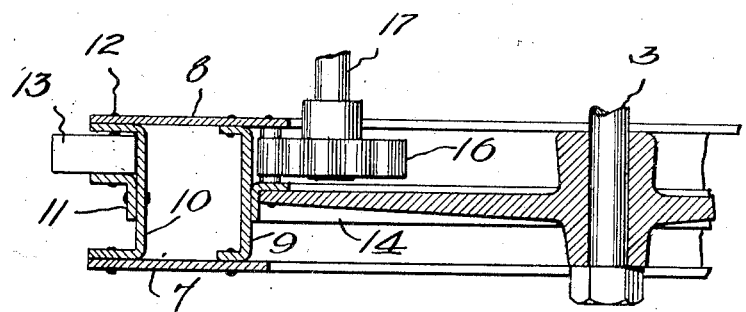
Fig. 6 is a fragmentary sectional view of a slightly modified form.

To drive the large wheels, for travel over ice or snow, the clutch members 21 are thrown into engagement with the clutch members 20 thereby driving the said wheels through the medium of said teeth 15. In Fig. 6 a modified form of device is shown. The wheels 4 are removed from the axle 3 and the wheels comprising the rims 7, 8 are substituted therefor and the same are driven by the pinions 16 in engagement with the teeth 15. The last named wheels are, of course, loose upon the axle 3. To stop the vehicle the motor is shut off and brakes applied to the front vehicle wheels. To remove the tractor wheels the pinions 16 are removed from their shaft 17 and the terminal nuts of the shaft 3 removed when the tractor wheels, with the vehicle jacked up, may be removed.

What is claimed is—

In a motor vehicle comprising a chassis, a driving axle, wheels removably arranged upon said driving axle to run loosely thereupon, drive wheels arranged fast upon said axle and encompassed by the first named wheels, said driving wheels being adapted for use when said first named wheels are removed, a transmission shaft journaled to said chassis, power transmission means connecting said transmission shaft and the wheels loose upon said drive shaft, and power transmission mechanism releasably connecting said transmission shaft with said driving axle.

In testimony that I claim the foregoing as my own I have hereto affixed my signature in the presence of two subscribing witnesses.

EMIL DANIELS.

Witnesses:
 ALEX. ANTMEEK,
 WALTER O. WRIGHT.